(12) United States Patent
Zern et al.

(10) Patent No.: US 9,182,213 B2
(45) Date of Patent: Nov. 10, 2015

(54) PATH MEASURING APPARATUS WITH MULTIPLE MEASURING PATHS

(71) Applicant: BALLUFF GmbH, Neuhausen (DE)

(72) Inventors: Achim Zern, Heilbronn (DE); Gerd Eckel, Wendlingen (DE)

(73) Assignee: BALLUFF GmbH, Neuhausen (DE)

( * ) Notice: Subject to any disclaimer, the term of this patent is extended or adjusted under 35 U.S.C. 154(b) by 312 days.

(21) Appl. No.: 13/755,343

(22) Filed: Jan. 31, 2013

(65) Prior Publication Data

US 2013/0181700 A1 Jul. 18, 2013

Related U.S. Application Data

(63) Continuation of application No. PCT/EP2011/063099, filed on Jul. 29, 2011.

(30) Foreign Application Priority Data

Aug. 9, 2010 (DE) .......................... 10 2010 039 055

(51) Int. Cl.
  *G01B 7/14* (2006.01)
  *G01B 7/02* (2006.01)
  *G01D 5/48* (2006.01)
  *G01D 11/24* (2006.01)

(52) U.S. Cl.
  CPC *G01B 7/14* (2013.01); *G01B 7/023* (2013.01); *G01D 5/485* (2013.01); *G01D 11/245* (2013.01)

(58) Field of Classification Search
  CPC ........ G01B 7/023; G01B 7/14; G01D 11/245; G01D 5/485

USPC .................................................... 324/207.13
See application file for complete search history.

(56) References Cited

U.S. PATENT DOCUMENTS

| | | | | |
|---|---|---|---|---|
| 4,071,818 | A | * | 1/1978 | Krisst ....................... 324/207.13 |
| 4,121,155 | A | | 10/1978 | Chamuel |
| 5,532,476 | A | | 7/1996 | Mikan |
| 6,185,155 | B1 | | 2/2001 | Steinich |
| 6,903,544 | B2 | | 6/2005 | Kurz et al. |
| 7,071,680 | B2 | | 7/2006 | Kurz et al. |
| 7,965,073 | B2 | | 6/2011 | Steinich |
| 2001/0017539 | A1 | | 8/2001 | Brunsch et al. |
| 2003/0076089 | A1 | | 4/2003 | Kurz et al. |
| 2005/0174108 | A1 | | 8/2005 | Kurz et al. |
| 2007/0296404 | A1 | * | 12/2007 | Steinich ................... 324/207.13 |
| 2008/0150520 | A1 | | 6/2008 | Steinich |

FOREIGN PATENT DOCUMENTS

| | | |
|---|---|---|
| CN | 101788259 | 7/2010 |
| DE | 195 48 138 | 7/1996 |
| DE | 197 53 805 | 6/1999 |
| DE | 102 01 880 | 7/2003 |

(Continued)

*Primary Examiner* — Jay Patidar
(74) *Attorney, Agent, or Firm* — Lipsitz & McAllister, LLC

(57) ABSTRACT

The invention relates to a path measuring apparatus comprising at least a first measuring path and a second measuring path, these measuring paths each having an extension in a longitudinal direction and being oriented parallel to one another in at least a measuring range, at least one position indicator which couples to the measuring paths in a non-contact manner, and a measuring path holder which extends in the measuring range and has recesses, each recess having a measuring path arranged therein.

49 Claims, 13 Drawing Sheets

(56) References Cited

FOREIGN PATENT DOCUMENTS

| | | |
|---|---|---|
| DE | 10 2004 062 968 | 7/2006 |
| EP | 1 306 650 | 5/2003 |
| WO | WO 2005/100907 | 10/2005 |

* cited by examiner

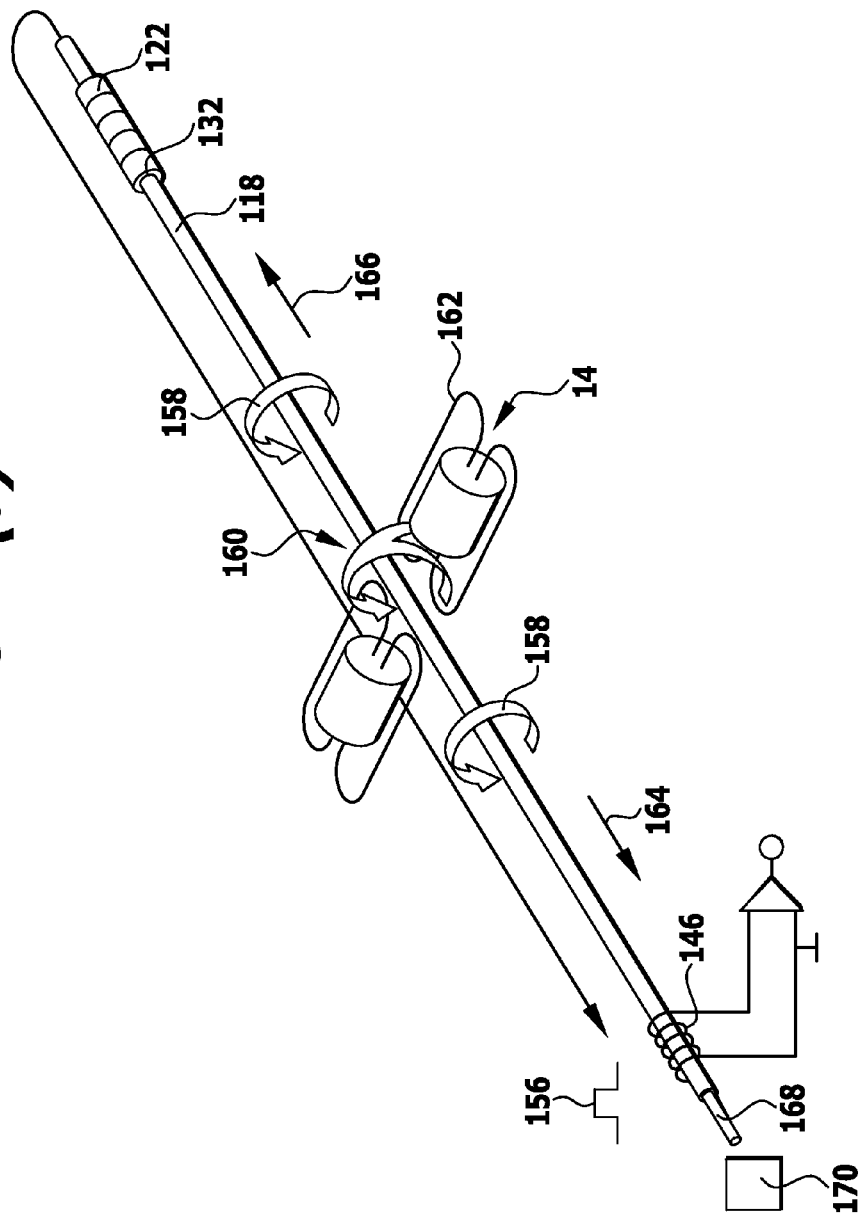

PATH MEASURING APPARATUS WITH MULTIPLE MEASURING PATHS

This application is a continuation of international application number PCT/EP2011/063099 filed on Jul. 29, 2011 and claims the benefit of German application No. 10 2010 039 055.0 filed on Aug. 9, 2010, which are incorporated herein by reference in their entirety and for all purposes.

BACKGROUND OF THE INVENTION

The invention relates to a path measuring apparatus comprising at least a first measuring path and a second measuring path, these measuring paths each having an extension in a longitudinal direction and being oriented parallel to one another in at least a measuring range, and comprising at least one position indicator which couples to the measuring paths in a non-contact manner.

EP 1 306 650 A1 discloses a transducer apparatus for detecting the path of a position indicator, said transducer apparatus comprising a measuring probe extending in a longitudinal direction, the position indicator coupling to the measuring probe in a non-contact manner.

If a plurality (at least two) measuring paths, i.e. at least two measuring probes, are provided, redundant path measurement or position detection can be achieved. A corresponding path measuring apparatus can be advantageously used for example in applications that are relevant to safety.

DE 10 2004 062 968 A1 discloses a path measuring apparatus comprising a housing in the form of an inherently stable hollow profile that is circumferentially closed and is sealable at an end face thereof and has a contour which is constant in cross-section; a waveguide unit located inside the profile, wherein the waveguide of the waveguide unit extends in a longitudinal direction of the profile; evaluation electronics; and, as a position indicator, a magnet movable in a longitudinal direction along the profile on the outside thereof. The profile has a stepless inner contour along the entire length thereof, and at least one insert having an inner contour is arranged so as to be rotationally fixed in a rotation direction about the longitudinal axis, said inner contour also having inner corners, outer corners and/or steps as desired.

US 2001/0017539 A1 discloses a modular waveguide assembly.

CN 101788259 discloses a magnetostrictive displacement sensor comprising two sets of signal generating devices. Each set comprises a waveguide wire.

DE 197 53 805 A1 discloses a support for waveguides which serve to conduct mechanical waves, wherein the support has a high proportion of gas and a low proportion of solid material.

U.S. Pat. No. 4,121,155 discloses a position determination system.

SUMMARY OF THE INVENTION

In accordance with an embodiment of the invention, a path measuring apparatus is provided which can be implemented with small dimensions.

In accordance with an embodiment of the invention, the path measuring apparatus comprises a measuring path holder which extends in the measuring range and has recesses, each recess having a measuring path arranged therein.

A plurality of measuring paths, such as two measuring paths or three measuring paths, can be accommodated on the measuring path holder with low space requirement.

A redundant path measuring apparatus can thereby be implemented which in terms of a transducer comprising the measuring path holder has dimensions that are identical or similar to that of a path measuring apparatus having a single measuring path.

The measuring path holder allows the measuring paths to be supported therein in a defined manner with good resistance to shock and low sensitivity to vibrations.

In an example of an embodiment, at least a third measuring path is provided. A multiply redundant path measuring apparatus, namely a triply redundant path measuring apparatus, is thereby provided.

In an embodiment, a measuring path comprises a waveguide and comprises in particular a wire waveguide. The position of the position indicator and hence a path can be determined by determining a wave running time.

It is particularly advantageous for the waveguide to be arranged in a flexible tube and to be arranged in particular in a flexible silicone tube. The flexible tube is preferably made of an electrically isolating material. Electrical isolation of the individual measuring paths can thereby be achieved. Furthermore, the flexible tube serves to support the measuring paths on the measuring path holder. Use of a defined support with high resistance to shock (without repositioning the waveguides) results in a good linearity for the measuring paths, i.e. there are small variations in distance between the position indicator and the waveguide throughout the entire length of the measuring range.

It is advantageous for the flexible tube to be constricted at locations thereof spaced apart from one another and, for example, to contact the waveguide. Relative fixing between the waveguide and the flexible tube is thereby achieved. The waveguide is thereby fixed relative to the flexible tube. The fixing is in particular a support of the waveguide on the flexible tube with some clearance, said clearance being defined and of small amount. The flexible tube in turn then allows the waveguide to be supported on the measuring path holder.

It is particularly advantageous for the measuring path holder to be made of a fibre-reinforced material and in particular of a fibreglass-reinforced material and preferably of a fibreglass-reinforced plastics material. Using a fibre-reinforced material, the measuring path holder has a low thermal expansion coefficient. This allows constraint forces on the measuring paths to be minimized. Furthermore, the measuring path holder can thereby be readily produced from an electrically isolating material so that electrical isolation of the measuring paths can be easily provided for.

In particular, a fibre orientation is then at least approximately parallel to a longitudinal direction of a measuring path.

It is advantageous for the recesses on the measuring path holder to be arranged in a rotationally symmetrically distributed manner about a longitudinal axis of the measuring path holder. It is thereby possible to achieve a maximum distance between the measuring paths in order to minimize mutual interference therebetween. If the position indicator is arranged, and configured, symmetrically, it is easily possible to have all of the measuring paths coupling to the position indicator in the same manner and at the same time in order to achieve high redundancy.

It is advantageous for a recess on the measuring path holder to be laterally open. A measuring path can thereby be easily inserted in the measuring path holder when manufacturing the transducer apparatus.

It is advantageous for a measuring path in a recess to be surrounded by wall material of the recess at an angle of at least 220° and preferably at an angle of at least approximately 270°. This allows a measuring path to be fixed to the measuring path holder in a simple and secure manner, in particular in combination with a support of a waveguide in a flexible tube.

A measuring path is received over its entire length in the measuring range by the measuring path holder. A defined orientation of the measuring path is thereby obtained along the entire length of the measuring range with high shock stability.

By way of example, the measuring path holder has a cylindrical outer contour. Small outside dimensions can thereby be achieved.

By way of example, a maximum thickness of the measuring path holder is 10 mm at most. A corresponding measuring path holder can be produced by a pultrusion process, for example. A multiply, for example triply, redundant path measuring apparatus can thereby be easily produced with small installation space requirements.

It is advantageous for the measuring path holder to have T-shaped elements relative to its cross-section, said T-shaped elements having the recesses formed therebetween. It is thereby possible to create walls between the recesses that are of uniform wall thickness. Furthermore, regions can be provided that overlap the respective measuring paths, thereby fixing the latter securely to the measuring path holder.

In particular, the T-shaped elements are arranged in a star-shaped manner. High symmetry is thereby obtained for the measuring path holder and hence for the arrangement of the measuring paths.

In an embodiment, a recess has a first region in which confining walls have an at least approximately flat side. It is thereby possible to implement these confining walls with a uniform wall thickness. The manufacture of the measuring path holder is correspondingly simplified.

It is further advantageous for a recess to have a second region in which walls confining the recess are rounded. An "overlap region" can thereby be provided in which a measuring path is surrounded by material of the measuring path holder (except for a lateral opening, if present).

It is particularly advantageous for the measuring path holder to have a central region in which walls confining the recesses are of uniform wall thickness. In this way, it is easily possible to provide a mechanically stable measuring path holder that is capable of accommodating a plurality of measuring paths, while having minimized dimensions.

In particular, a measuring range length of the measuring paths is at least 2 cm and in particular 2.5 cm, i.e. the position of a position indicator can be determined in this length range.

The measuring paths are in particular independent of one another and simultaneously couple to the same at least one position indicator in order to achieve high redundancy.

It is further advantageous for a measuring head to be provided which has the measuring path holder arranged thereon and in particular coaxially arranged thereon. A sensing device of the path measuring apparatus can be positioned in the measuring head. This comprises in particular coils. The use of other sensing elements, such as piezo elements, Hall elements or magnetostrictive elements, is also possible.

The measuring paths each have a continuation into the measuring head. A waveguide in particular, optionally with a flexible tube surrounding it, is routed in an uninterrupted path into the measuring head.

It is advantageous for the measuring head to have cross-sectional dimensions larger than that of the measuring path holder. This allows sensing elements and in particular pickup coils to be positioned in the measuring head with a greater spacing from each other in order to reduce crosstalk. Furthermore, this also allows the measuring head to be used for fixing the path measuring apparatus to an application for example.

It is advantageous for the measuring head to have arranged thereon a holding device for fixing the path measuring apparatus to an application. The holding device comprises in particular a holding plate which is fixed to the measuring head. The holding plate in turn allows the path measuring apparatus to be fixed to an application.

In an embodiment, a coil device is arranged on the measuring head, with each measuring path having at least one pickup coil associated with it. The pickup coil forms a signal transducer which, through reversing the magnetostrictive effect and magnetic induction, generates an electrical signal that can then be evaluated. Said electrical signal contains information about the position of the position indicator.

An area of a continuation of the measuring path in the measuring head that is coupled to the coil device is positioned outwardly offset with respect to a longitudinal axis of the measuring path holder. This allows the spacing between the pickup coils for the respective measuring paths to be maximized, and this in turn allows crosstalk to be reduced.

In this area of the continuation, provision is made in particular for an at least approximately linear orientation in order to achieve effective coupling between a waveguide and a pickup coil. Different continuations are in particular oriented parallel to each other in these areas.

It is advantageous for the continuation of the measuring path to have a transition region between the measuring path holder and the coil device, and in particular for the continuation in the transition region to be routed in a bent path. This affects wave conductance in a minimal manner.

It is further advantageous for the pickup coils, which are associated with the respective measuring paths, to be arranged in a rotationally symmetrically distributed manner about an axis of the measuring head. In this way, pickup coils which are associated with different measuring paths are spaced apart by a maximum spacing and the risk of crosstalk is reduced.

It is particularly advantageous for the at least one pickup coil of the respective measuring path to have in each case at least one resistor element associated with it. By a corresponding selection of the resistor elements, the individual measuring instruments can be normalized relative to one another and also relative to measurement interface electronics.

It is further advantageous for the at least one resistor element to be arranged on a flexible tape and in particular external to the measuring head. The flexible tape is in particular a flex tape including corresponding conductors which is routed to a measurement interface. The flexible tape is then at the same time a support for the at least one resistor element.

In an embodiment, the measuring head has a coil holder to which is fixed a measuring path holder carrier. This results in a simple mechanical construction of the measuring head, and the measuring path holder can be fixed in a simple manner.

In particular, the measuring path holder carrier has a marking device and/or positioning device for the measuring path holder. In this way, the measuring path holder can be easily oriented relative to the measuring path holder carrier, and thus also relative to the coil holder, when manufacturing the path measuring apparatus.

It is then further advantageous for the measuring path holder carrier and the coil holder to have associated therewith a lug-and-groove device for rotational fixing one to the other. The assembly of the path measuring apparatus can thereby be facilitated.

It is advantageous for a holding device plate to be fixed to the coil holder. A holding device for fixing the transducer apparatus to an application can thereby be provided in a simple manner.

It is then further advantageous for the holding device plate and the coil holder to have associated therewith a lug-and-groove device for rotational fixing. This provides a simple way of allowing the holding device plate to be rotationally fixed with respect to the coil holder.

It is further advantageous for a latch device to be provided comprising a latch associated with a respective measuring path continuation, said latch being arranged on a coil holder and fixing the continuation of the measuring path in the coil holder. The coil holder must have corresponding recesses for the measuring path continuation; this requirement includes the presence of recesses that are not parallel to an axis of the measuring head or the measuring path holder. In particular, provision is made for the measuring path and the measuring path continuation to be routed in an S-shaped path. The provision of a latch allows a corresponding recess to be created laterally from the outside, without having to provide an inclined bore or the like. The recess is then closed via the latch associated with it; at the same time, this allows a defined positioning of a measuring path continuation to be achieved.

Provision may be made for a magnet device to be integrated in the latch device. The magnet device provides a bias magnet which serves to reduce crosstalk among different measuring paths. The influence a current pulse travelling on one measuring path has on the pickup coil of another measuring path can thereby be reduced. By way of example, a corresponding magnet device can be implemented through a plastic-bonded magnet which at the same time forms a latch.

It is particularly advantageous for the measuring paths to be individually electrically isolated. Independent measuring paths can thereby be achieved.

For the same reason, it is advantageous for each measuring path to have a magnetic shield of its own associated with it.

It is further advantageous for a pickup coil device which is associated with a respective measuring path to have in each case a magnetic shield of its own, wherein each magnetic shield is in particular at its own potential. This allows crosstalk to be minimized.

It is further advantageous for an induction voltage limiting device to be provided which influences an edge steepness of current pulses at turn-on and/or turn-off. In particular in the case of a current pulse at turn-off, the induction voltage limiting device provides for a decay from maximum amplitude to zero amplitude to take place within a time period of at least 1.5 μs and in particular within a time period of at least 2 μs. This minimizes induction voltages that may be induced in other measuring paths or measuring path continuations, and the risk of crosstalk is reduced.

Provision may further be made for the measuring path holder to have at least one additional conductor arranged therein. This additionally routed conductor, running electrically parallel to corresponding waveguides of the measuring path, may compensate for crosstalk. This can be achieved by a corresponding current intensity and also by the way in which the at least one additional conductor is laid.

The path measuring apparatus comprises in particular a magnetostrictive transducer in which an excitation current pulse originating from a measurement interface triggers a measurement. The excitation current pulse is triggered by a start signal. The excitation current pulse generates a circular magnetic field on a waveguide which, owing to the magnetically soft properties of the waveguide, is bundled therein. At a measuring point, magnetic field lines of the position indicator are orthogonal to the circular magnetic field and are bundled in the waveguide. In this area, where the magnetic fields interact with each other, elastic deformation occurs in the micro-range of the structure of the waveguide due to magnetostriction. This elastic deformation produces an elastic wave that propagates along the waveguide. A returning transonic wave produces an electrical signal at a pickup coil through reversing the magnetostrictive effect and magnetic induction. The wave running time is proportional to the distance between the position indicator and the pickup coil. The distance between the pickup coil and the position indicator can be determined with high accuracy by making a time measurement. The primary measuring signal for the time measurement is the excitation current pulse on the waveguide and its reaction pulse, which is supplied with a time delay depending on the position of the position indicator.

The following description of preferred embodiments serves to explain the invention in greater detail in conjunction with the drawings.

BRIEF DESCRIPTION OF THE DRAWINGS

FIG. 12(a) is a schematic representation of a waveguide for explaining the principles of operation thereof.

DETAILED DESCRIPTION OF THE INVENTION

Figure 1:
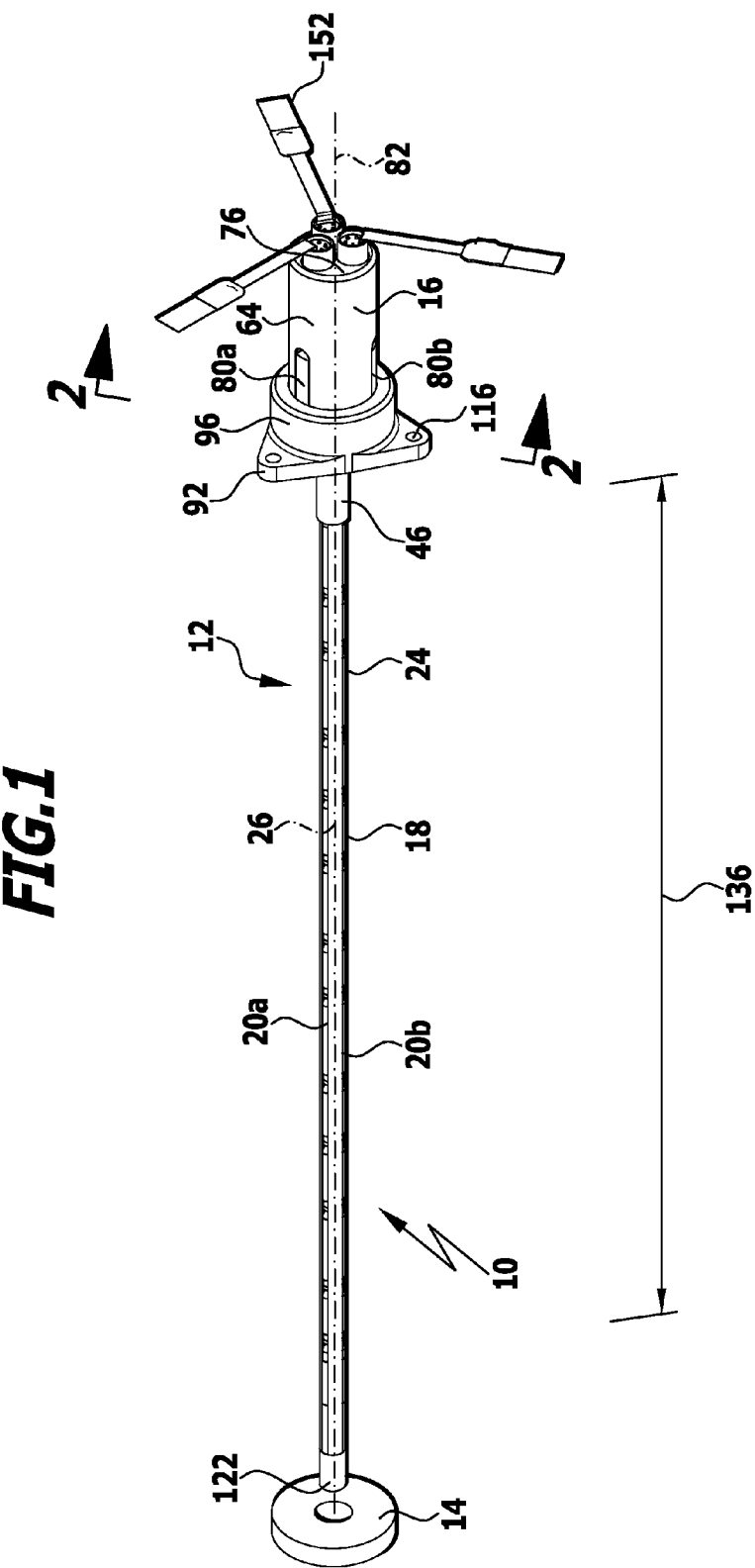
FIG. 1 is a perspective view of an example of an embodiment of a path measuring apparatus constructed in accordance with the invention.

An example of an embodiment of a path measuring apparatus constructed in accordance with the invention, shown in FIG. 1 and indicated therein by 10, comprises a transducer 12 and a position indicator 14. The transducer 12 is in particular configured as a magnetostrictive transducer. The position indicator 14 is a magnet and is in particular a permanent magnet which may take the form of a ring magnet for example.

The transducer 12 comprises a measuring head 16. A path device 18 is held on the measuring head 16. The path device 18 has a plurality of parallel measuring paths $20a$, $20b$, $20c$ (FIGS. 1, 5, 6, 8). In the example of an embodiment shown, a first measuring path $20a$, a second measuring path $20b$ and a third measuring path $20c$ are provided. In a measuring range, the measuring paths $20a$, $20b$, $20c$ are oriented parallel to one another and extend linearly. The position indicator 14 couples to all of the measuring paths 20a, 20b, 20c simultaneously. It is thereby possible for the position of the position indicator 14 relative to the transducer 12 to be determined triply redundant along the three measuring paths 20a, 20b, 20c, independently of one another. Such a redundant position determination is advantageous in particular for applications relevant to safety (such as for steam valve position detection in a nuclear power plant or for detecting the pitch of a marine propeller).

Figure 3:
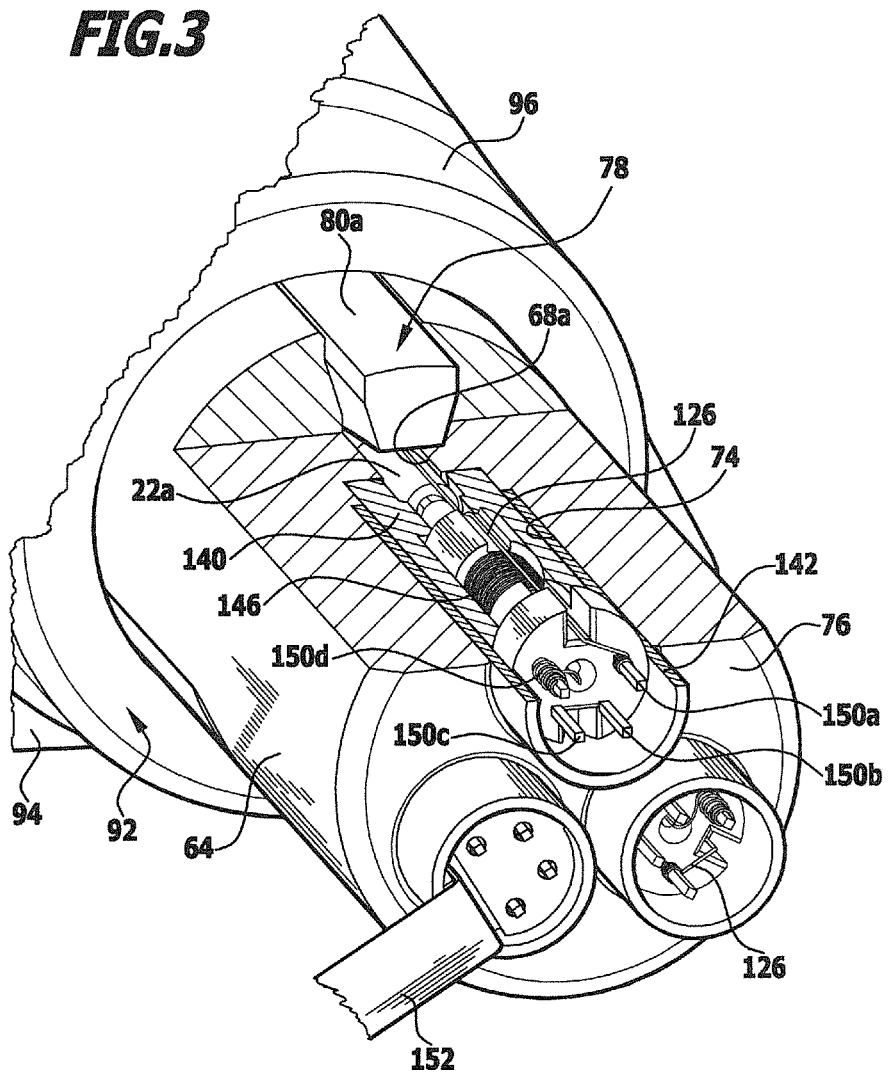
FIG. 3 is a perspective partial sectional view of a portion of a measuring head employed in the path measuring apparatus in accordance with FIG. 1.
Figure 4:
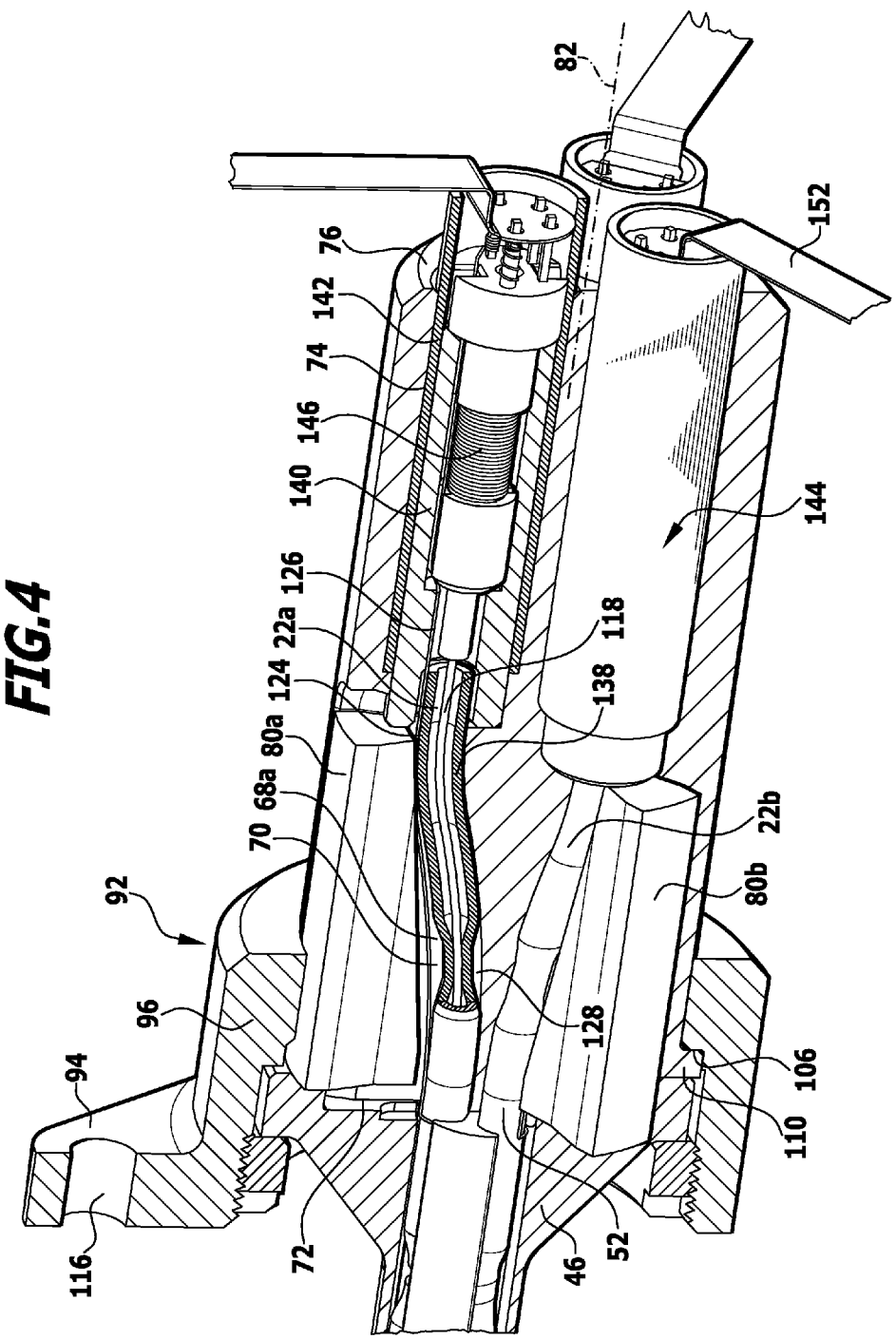
FIG. 4 is a further perspective sectional view of a measuring head.
Figure 5:
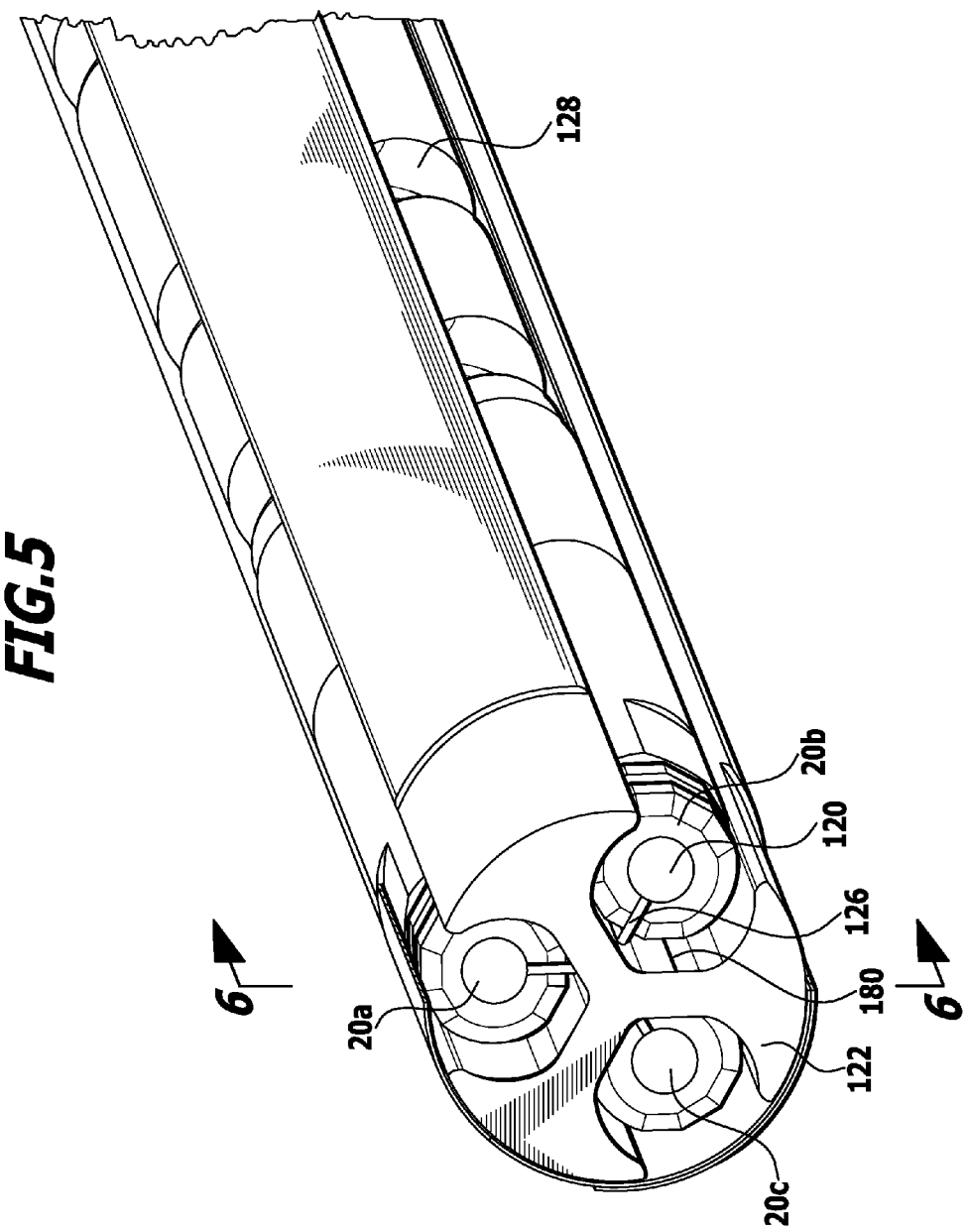
FIG. 5 is a partial view of a measuring path holder.
Figure 6:
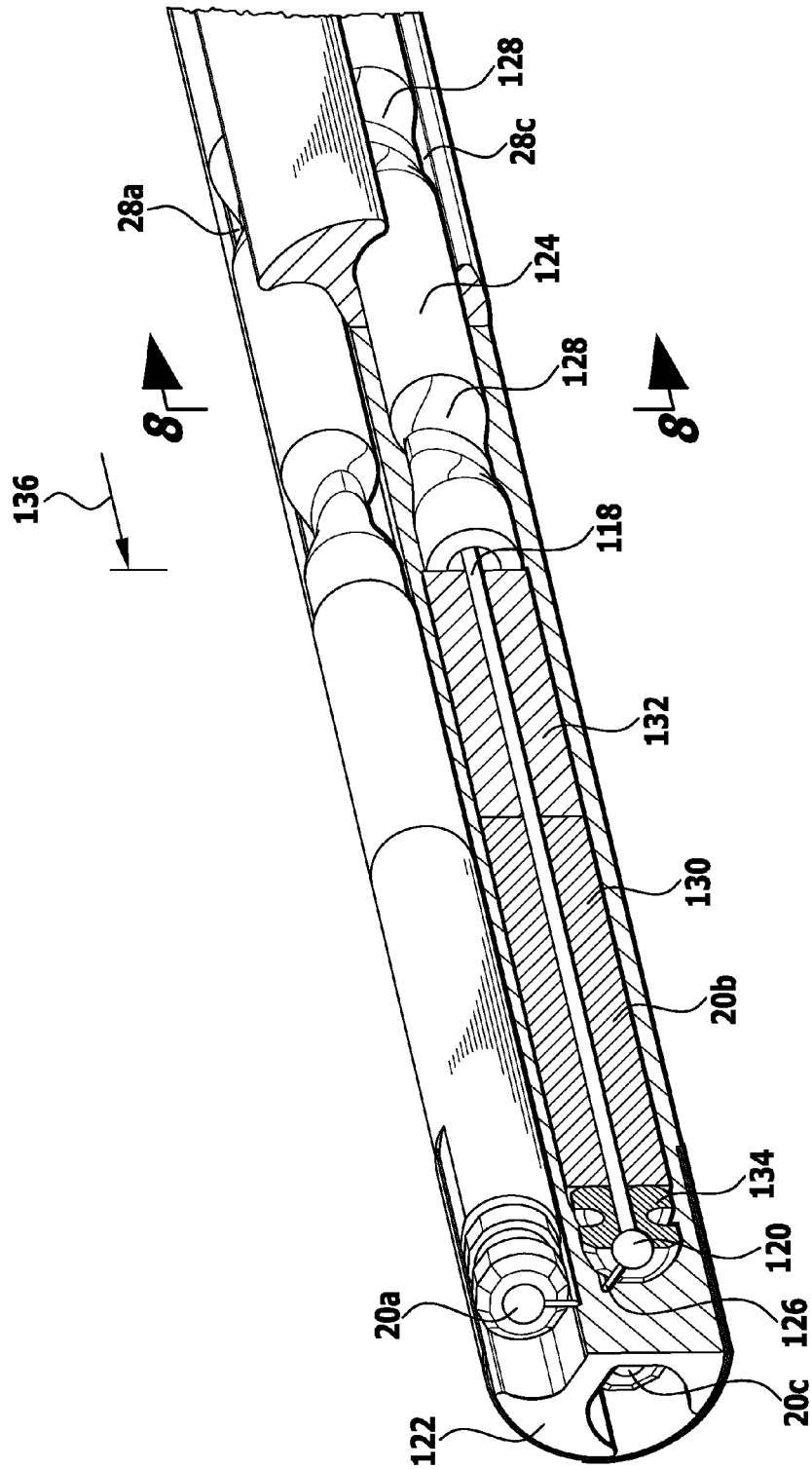
FIG. 6 is a perspective sectional view along line 6-6 in accordance with FIG. 5.

The measuring paths 20a, 20b, 20c are arranged on the path device 18. The measuring paths 20a, 20b, 20c have measuring path continuations 22a, 22b, 22c respectively associated therewith which are positioned in the measuring head 16 (FIGS. 3, 4).

The transducer 12 has a measuring path holder 24. Said measuring path holder 24 extends in a longitudinal direction 26 along a corresponding axis. The measuring path holder 24 has a cylindrically shaped outside contour (FIGS. 5 to 8). It is arranged in a protective tube (not shown in the drawings).

The measuring path holder 24 extends along the entire length of the measuring paths 20a, 20b, 20c and has a length greater than that of these measuring paths, as will be explained in more detail below.

The measuring path holder 24 has a groove-shaped first recess 28a for the first measuring path 20a, a groove-shaped second recess 28b for the second measuring path 20b and a groove-shaped third recess 28c for the third measuring path 20c. The measuring paths 20a, 20b, 20c are arranged in the recesses 28a, 28b, 28c respectively. The recesses 28a, 28b, 28c extend in the longitudinal direction 26 and are oriented parallel to one another and thus parallel to the axis 26.

The measuring path holder 24 is made of a fibre-reinforced material and is in particular made of a fibre-reinforced plastics material. The fibres are preferably glass fibres. A fibre orientation is at least approximately parallel to the longitudinal direction 26. This results in the measuring path holder 24 having a low thermal expansion.

The measuring path holder 24 is produced by a pultrusion process for example. In an example of an embodiment, a maximum thickness D (diameter) is 10 mm at most (refer to FIGS. 7 and 8). In a concrete example of an embodiment, said thickness is approximately 6 mm.

Figure 7:
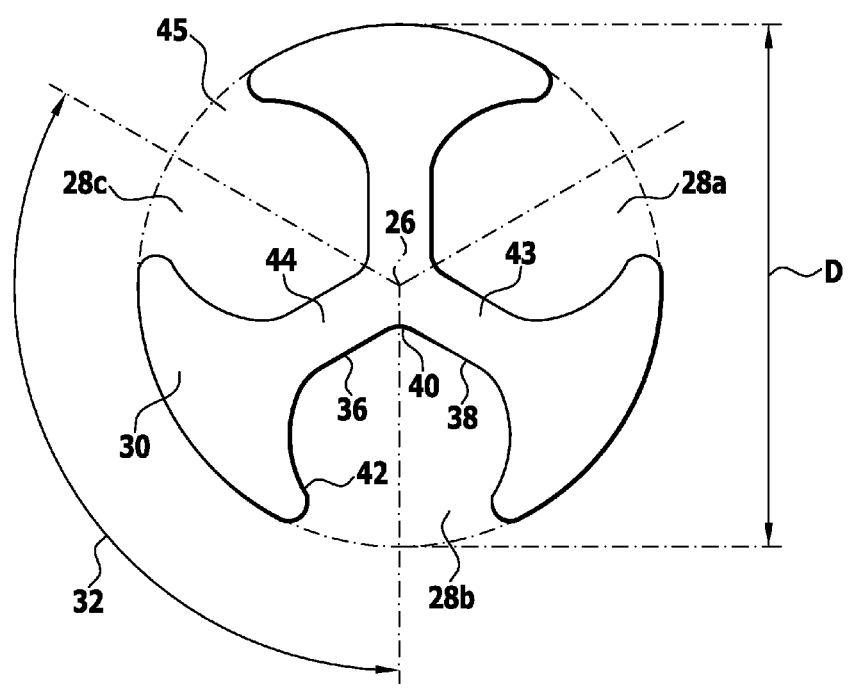
FIG. 7 is a sectional view of a measuring path holder.
Figure 8:
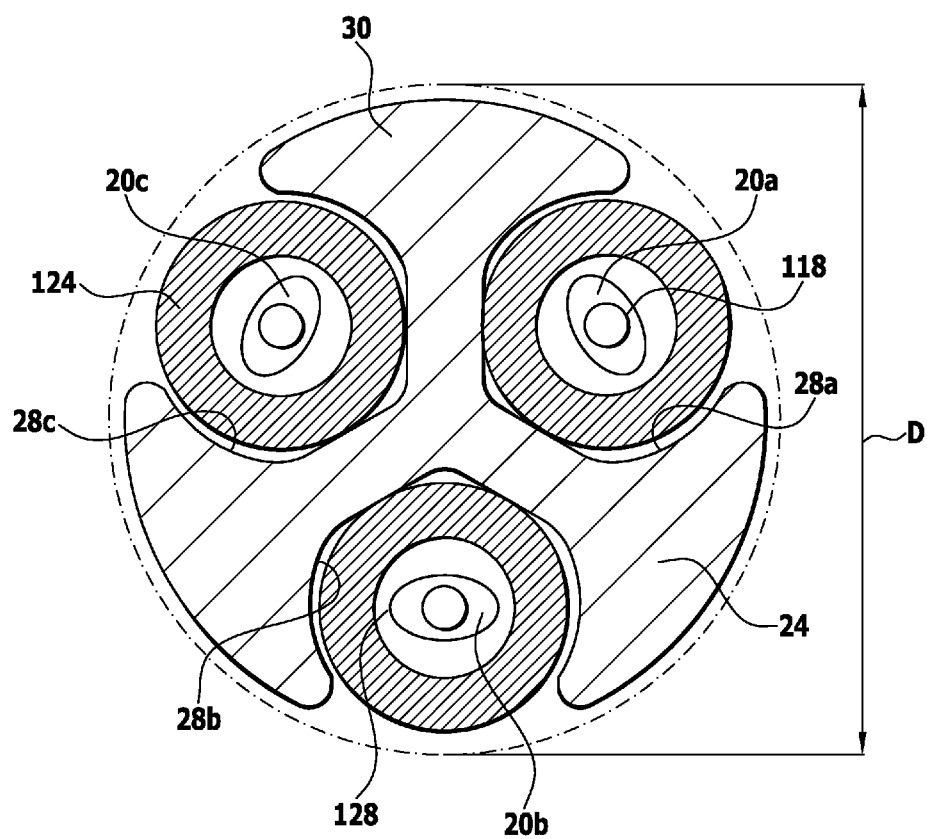
FIG. 8 is a view similar to FIG. 7, showing measuring paths arranged therein (corresponding to a sectional view along line 8-8 in accordance with FIG. 6)

The measuring path holder 24 has elements 30 that are connected to one another and are of T-shaped configuration relative to its cross-section (FIGS. 7, 8). Said T-shaped elements 30 are arranged in a star-shaped manner. The T-shaped elements 30 and thus the recesses 28a, 28b, 28c are arranged in a rotationally symmetrical and uniformly distributed manner through an angle 32 of 120° around the longitudinal direction 26. The T-shaped elements 30 have identical configuration.

The respective recesses 28a, etc. are separated by walls 34 having a uniform wall thickness. The recesses 28a, etc. are of non-circular configuration. They have a first region 36 where the confining walls 34 have an at least approximately flat side 38. Corresponding flat sides 38 conjoin, and the transition region 40 is rounded.

The recesses 28a, etc. further have a second region 42. In that region, the walls 34 are arcuate, and in particular rounded, in configuration.

In a central region 44 in proximity to the axis 26, the walls 34 are of uniform wall thickness, as mentioned above.

The recesses 28a, etc. have an opening 45 to the outside, parallel to the longitudinal direction 26. The recesses 28a, etc. are thus configured in the form of grooves on the measuring path holder 24. The walls 34 surround the recess in an angular range of at least 220°, for example in an angular range of 270°. A measuring path 20a, etc. arranged in the respective recess 28a, etc. is thereby surrounded by wall material of the measuring path holder 24, except for the opening 45.

Figure 2:
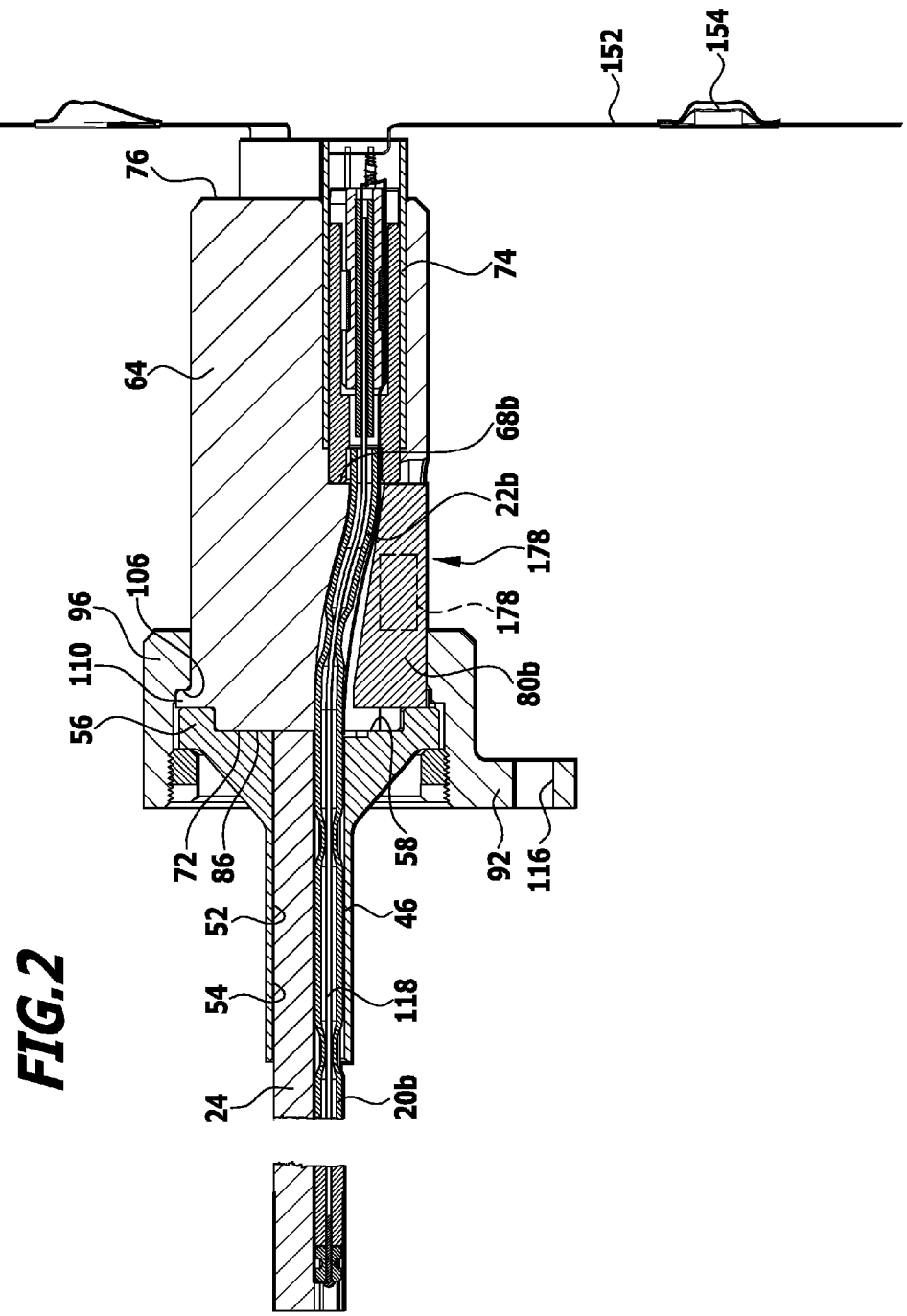
FIG. 2 is a sectional view along line 2-2 in accordance with FIG. 1.
Figure 9:
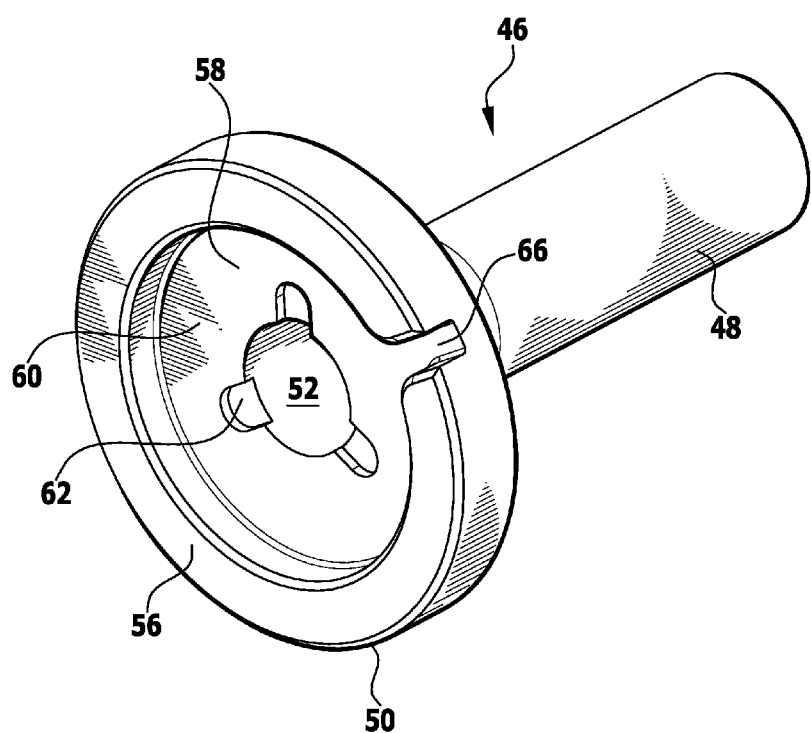
FIG. 9 is a perspective view of an example of an embodiment of a measuring path holder carrier.

The measuring head 16 has a measuring path holder carrier 46 on which the measuring path holder 24 is held (FIGS. 1, 2, 9). Said measuring path holder carrier 46 comprises a cylinder sleeve 48 which is seated on a pot 50. The pot 50 has an opening 52 which corresponds to an interior space 54 of the cylinder sleeve 48. Said opening 52 has the measuring path continuations 22a, 22b, 22c passed therethrough. Furthermore, the pot 50 has a circumferential collar 56 on its side facing away from the cylinder sleeve 48. A cylindrical space 60 is defined between a bottom 58 and the collar 56.

Arranged on the bottom 58 and distributed at an angle of 120° around the opening 52 are markings 62 of a marking device for the measuring path holder 24. These markings 62 correspond to the positions of the measuring paths 20a, 20b, 20c and promote ease of assembly.

The measuring path holder carrier 46 is fixed to a coil holder 64 (FIGS. 1, 2, 10) of the measuring head 16, as will be further described hereinbelow in greater detail. The coil holder 64 and the measuring path holder carrier 46 have associated with them a lug-and-groove device for rotationally fixing one to the other. To this end, a groove 66 is arranged for example in the collar 56 of the measuring path holder carrier 46.

The coil holder 64 has a cylindrical shape. Arranged within the coil holder 64 are recesses 68a, 68b, 68c correlating to the number of measuring path continuations 22a, 22b, 22c. The first recess 68a is associated with the first measuring path continuation 22a, the second recess 68b is associated with the second measuring path continuation 22b, and the third recess 68c is associated with the third measuring path continuation 22c. A respective recess 68a, etc. has a first region 70 which extends from an end face 72 of the coil holder 64 facing towards the measuring path holder carrier 46 to a central region of the coil holder 64. Furthermore, a recess 68a, etc. has a second region 74 which extends from an end of the first region 70 to an end face 76 of the coil holder 64 facing away from the measuring path holder 24.

Figure 10:
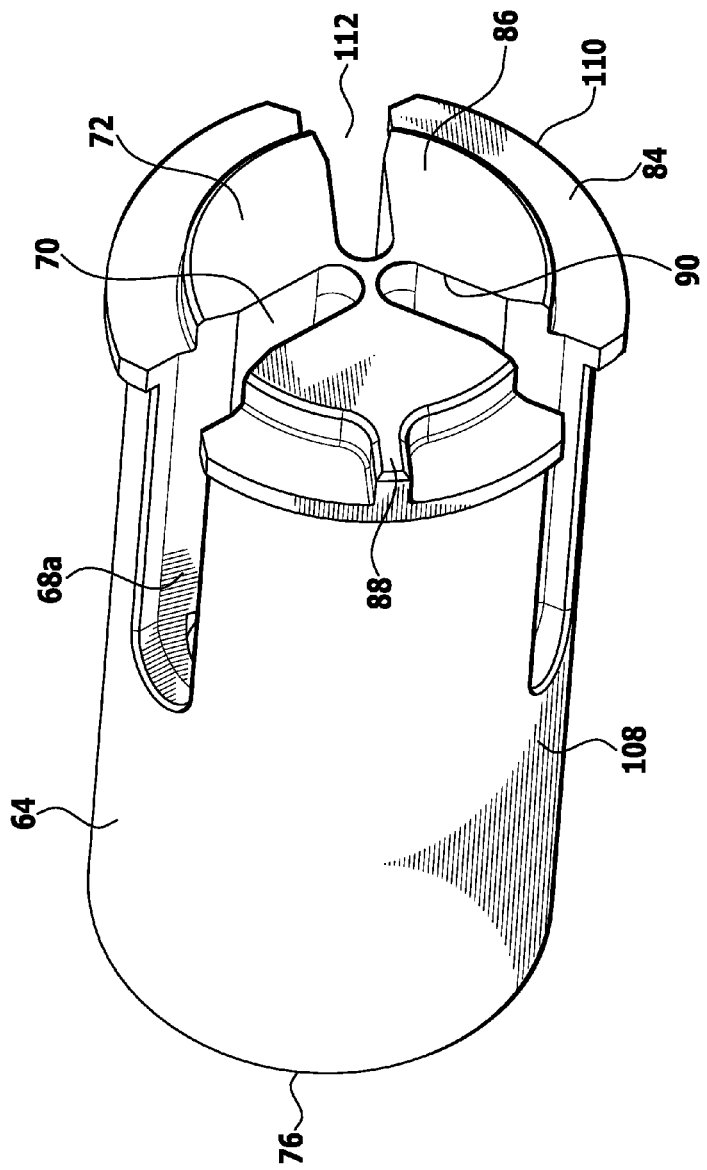
FIG. 10 is a perspective view of an example of an embodiment of a coil holder.

The second region 74 of the respective recess 68a, etc. is in particular configured in the form of a cylindrical bore within the coil holder 64. The first region 70 is configured as a depression which is laterally open (FIG. 10). For laterally closing the first region 70 of the recesses 68a, etc., a latch device 78 including respective latches 80a, 80b, 80c is provided, with the latch 80a being associated with the first region 70 of the first recess 68a, the latch 80b being associated with the first region 70 of the second recess 68b and the latch 80c being associated with the first region 70 of the third recess 68c. The latches 80a, 80b, 80c of the latch device 78 are fixed to the first region 70 of the corresponding recess 68a, 68b, 68c by way of adhesive bonding for example. They leave open an area in which the corresponding measuring path continuation 22a, 22b, 22c runs within the coil holder 64.

The measuring head 16 has an axis 82. Said axis 82 is coaxial with the axis 26 of the measuring path holder 24. The measuring path holder 24 is centrally seated on the measuring head 16. The measuring head 16 has a greater diameter than the measuring path holder 24.

The second region 74 of the recess 68a, etc. is parallely outwardly offset (away from the axis 82) and thus spaced from the axis 26. The opening 52 is coaxial with the axis 26 and thus also with the axis 82. The first region 70 provides a transition region between the opening 52 and the parallely offset second region 74. The first region 70 is configured such that the transition is continuous.

The recesses 68a, 68b, 68c for the measuring path continuations 22a, 22b, 22c in the coil holder 64 present the same symmetry of arrangement as the measuring paths 20a, 20b, 20c in the measuring path holder 24. In the example of an embodiment shown, the recesses 68a, 68b, 68c are arranged in a rotationally symmetric manner about the axis 82 and are in particular arranged in a star-shaped manner with an angular spacing of 120°. The recesses 68a, 68b, 68c are oriented parallel to one another in the second region 74 thereof.

The coil holder 64 has on its end face 72 a recessed edge region 84 which is adapted to the collar 56 of the measuring path holder carrier 46. The recessed edge region 84 surrounds a projection 86 which is positioned within the space 60. The projection 86 is surrounded by the collar 56.

Arranged on the edge region 84 is a lug 88 of the above-mentioned lug-and-groove device. Said lug 88 extends into the groove 66 of the measuring path holder carrier 46. Relative rotational movement between the coil holder 64 and the measuring path holder carrier 46 is thereby blocked. The lug 88 and the groove 66 are arranged such that the markings 62 are aligned with inlet openings 90 of the recesses 68a, 68b, 68c.

Figure 11:
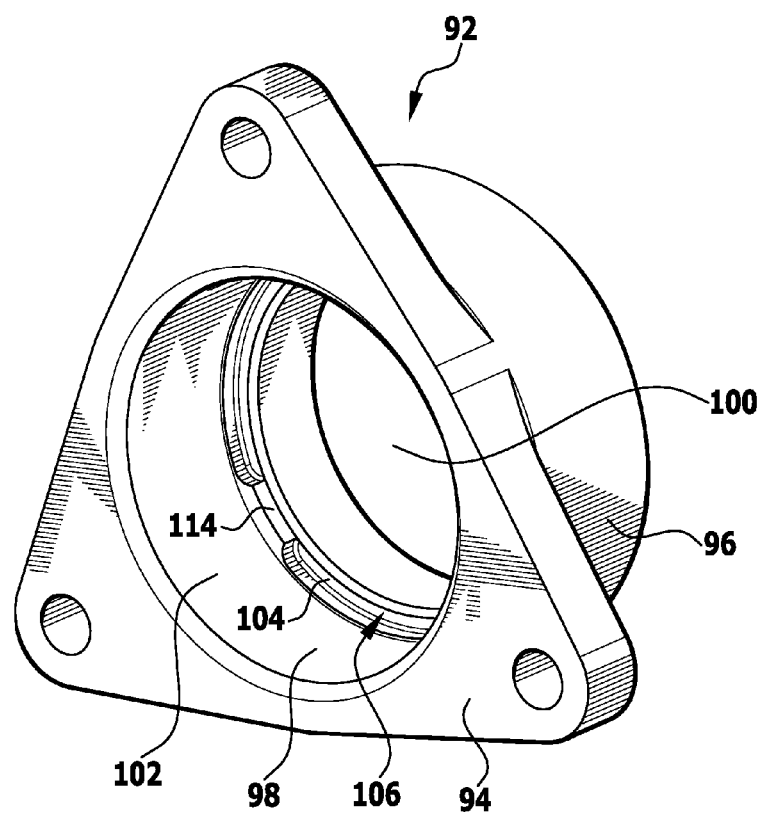
FIG. 11 is a perspective view of an example of an embodiment of a holding plate.

Furthermore, the measuring head 16 has a holding plate 92 (FIGS. 1, 2, 11). Said holding plate 92 is fixed to the coil holder 64. By way of example, the holding plate 92 has a triangular first region 94 (FIG. 11) on which is seated a cylindrical flange 96. Said flange 96 is fitted on the coil holder 64. A part of the coil holder 64 including the end face 72 passes through the flange 96. The flange 96 further surrounds the measuring path holder carrier 46.

The flange 96 and an opening 98 in the first region 94 define an interior space 100 of the holding plate 92. Positioned within the interior space 100 are the above-mentioned part of the coil holder 64 and a portion of the measuring path holder carrier 46 (namely the pot 50). The interior space 100 has a first portion 102 and a second portion 104. The first portion 102 is formed in the first region 94, and the second portion 104 is formed in the flange 96. The second portion 104 has a smaller diameter than the first portion 102. A contact face 106, which is in particular an annular contact face 106, is thereby formed.

The edge region 84 of the coil holder 64 projects outwards beyond a cylindrical outer contour 108 of the coil holder 64 (FIG. 10). An edge collar 110 is thereby formed. Said edge collar contacts the contact face 106. When manufacturing the transducer 12, the coil holder 64 is pushed, with its end face 76 first, through the first portion 102 of the interior space 100 until the edge collar 110 contacts the contact face 106.

The edge collar 110 of the coil holder 64 has cutouts 112 which correspond to the recesses 68a, etc. These cutouts form grooves of a lug-and-groove device for rotationally fixing the coil holder 64 relative to the holding plate 92. Corresponding lugs 114 are arranged on the contact face 106. When a lug 114 is located within a cutout 112 (groove), rotary movement between the holding plate 92 and the coil holder 64 is blocked.

Axial fixing between the holding plate 92 and the coil holder 64 of the measuring head 16 is for example by adhesive bonding. The fixing of the measuring head 16 is enhanced by the flange 96, which is configured in particular as a ring nut. Correspondingly, axial fixing between the measuring path holder carrier 46 and the coil holder 64 can likewise be realized by way of adhesive bonding.

In an embodiment, the flange 96 overlies at least part of the latch device 78.

In an embodiment, through-openings 116 are arranged at the first region 94 of the holding plate 92. By way of example, this allows the transducer 12 to be fixed on an application by screwing or the like.

The respective measuring paths 20a, 20b, 20c with their associated measuring path continuations 22a, 22b, 22c comprise in each case a wire waveguide 118. Said wire waveguide 118 is the "actual" measuring path. It is routed in a continuous path along the respective measuring path continuation 22a, etc. and measuring path 20a, etc. It is fixed to a damping sleeve 134. Said damping sleeve 134 is positioned in the vicinity of an end 122 of the measuring path holder 24. The damping sleeve 134 is a metal element.

The wire waveguide 118 is surrounded by a flexible tube 124. Said flexible tube 124 is made of an electrically isolating material and is for example a flexible silicone tube. On the one hand, it serves the electrical isolation of the wire waveguide 118; on the other hand, it serves supporting and positioning functions within the corresponding recesses 28a, etc. and 68a, etc.

A return conductor 126 is connected to the damping sleeve 134. The return conductor 126 is for example soldered to the metal element 134 with a solder point 120. The return conductor 126 is routed through the recesses 28a, etc. and 68a, etc., while being located external to the corresponding flexible tube 124.

The flexible tube 124 is constricted at locations 128 spaced apart from each other (FIGS. 4 to 6, FIG. 8), thereby reducing the freedom of movement of the wire waveguide 118. The constriction is not so narrow as to impede wave propagation. A relative positional fixing of the wire waveguide 118 with respect to the flexible tube 124 is thereby achieved. The relative positional fixing is a support with some (defined, small) clearance. This in turn enables positional fixing of the wire waveguide 118 to the transducer 12 when the flexible tube 124 is placed in the recesses 28a, etc. and 68a, etc.

Arranged within the recesses 28a etc. of the measuring path holder 24 are one or more damping masses 130, 132 adjacent to the metal element 134. A corresponding damping mass 130, 132 surrounds the wire waveguide 118 within this area and provides for the corresponding mechanical wave to be damped.

The damping sleeve 134 is arranged between the damping mass 130 and the solder point 120.

A measuring range 136 of the transducer 12 lies substantially between an end of the damping mass 132 against which the flexible tube 124 is in contact, and an end of the cylinder sleeve 48. The distance therebetween defines the length of the measuring range 136.

The wire waveguide 118 and correspondingly the return conductor 126, routed through the corresponding recesses 68a, etc., are also routed through the coil holder 64 (FIGS. 2 to 4). Within the measuring path holder 24, the wire waveguides 118 of the respective measuring paths 20a, 20b, 20c are routed parallel to one another and parallel to the axis. Their passage through the first region 70 of the recesses 68a, etc. results in a transversely offset arrangement thereof; in the second region 74, the wire waveguides 118 are routed parallel to the axis 26 again. The first region 70 is configured such that a mechanical wave can travel therethrough unhindered. In particular and for that purpose, the wire waveguide 118 is routed in this region using bends, while avoiding sharp corners. In particular, the wire waveguide follows a path curved in the manner of an S-shape.

The latches 80a, etc. of the latch device 78 and a bottom 138 of the first region 70 of the recesses 68a, etc. are correspondingly configured in order to enable "edgeless" ("continuously differentiable") S-shaped routing of the wire waveguide 118.

A sleeve 140 is arranged in the second region 74 of the respective recesses 68a, etc. Said sleeve 140 (FIG. 4) serves the fixing of the positioning of the wire waveguide 118 within said second region 74 of the recess and thereby the S-shaped routing. By way of example, the sleeve 140 (spacer sleeve) is adhesively bonded in the corresponding second region 74 of the recesses 68a, etc. It is surrounded by a shield tube 142. Said shield tube 142 is made of a magnetically shielding material.

A coil device 144 is held on the coil holder 64. The coil device 144 comprises (at least) one pickup coil 146 which is arranged at a measuring path continuation 22a, etc. in the second region 74 of the corresponding recess 68a, etc. The corresponding pickup coil 146 is in particular adhesively bonded in the sleeve 140.

The pickup coil 146 is seated in the sleeve 140 through pins 150a, 150b, 150c, 150d made of a metallic material. The return conductor 126 is wound around and soldered to the pin 150a.

The wire waveguide 118 is wound around the pin 150d.

In each case, a tape 152 with integrated conductors is seated at the pins 150a, 150b, 150c, 150d. The tapes 152 in turn each have (at least) one resistor element 154 arranged thereon. The resistor element of the respective tape 152 is located external to the coil holder 64. Each measuring path 20a with its measuring path continuation 22a has in each case a tape with a resistor element 154 of its own associated with it. A respective tape 152 is in particular configured as a flex tape. It carries the conductors and is also a support for the resistor element 154. The resistor elements 154 allow the respective measuring paths 20a, 20b, 20c to be normalized in relation to one another and also in relation to a circuit following them. It is in particular possible to compensate for unbalances in the electrical behaviour of the individual measuring paths 20a, 20b, 20c. Because the resistor elements 154 are readily accessible, this compensation is easy to accomplish.

The operating principles of the path measuring apparatus 10 will be explained schematically with reference to FIG. 12(a):

An excitation current pulse 156 originating from a measurement interface and serving as a measuring signal excites a measurement. The excitation current pulse 156 is triggered by a start signal. The excitation current pulse 156 generates a circular magnetic field 158 which, owing to the magnetically soft properties of the waveguide (wire waveguide) 118, is bundled therein. The position indicator 14 (in particular a permanent magnet) is positioned at a measuring point 160 of the waveguide 118. The magnetic field lines 162 of the position indicator 14 are orthogonal to the circular magnetic field 158 and are also bundled in the waveguide 118.

In an area in which the circular magnetic field 158 and the magnetic field generated by the position indicator 14 interact with each other, elastic deformation occurs in the microrange of the structure of the waveguide 118 due to magnetostriction. This elastic deformation in turn creates an elastic wave that propagates along the waveguide 118 in opposite directions 164, 166. The propagation speed of that wave within the waveguide 118 is in particular of the order of magnitude of approx. 2800 m/s and is largely immune to environmental influences.

The damping masses 130, 132 are arranged at the end 122 of the corresponding measuring path. By virtue of the damping masses 130, 132, the transonic wave moving towards the end 122 is damped away, and the back-reflected component of the wave is negligible for signal detection when compared with the directly propagating wave.

Arranged at the other end 168 is the corresponding pickup coil 146 which, through reversing the magnetostrictive effect and magnetic induction, generates an electrical signal and supplies this to the measurement interface.

The running time of the wave from its point of origin to the pickup coil 146 is directly proportional to the distance between the position indicator 14 and the pickup coil 146. The distance between the pickup coil 146 and the position indicator 14 can therefore be determined to a high degree of accuracy by making a time measurement. The primary measuring signal for the time measurement is the excitation current pulse 156, which is supplied by the pickup coil 146 to the measurement interface with a time delay that is dependent on the distance between the pickup coil 146 and the position indicator 14.

It is generally the case that an excitation current pulse sent to one measuring path (for example to the measuring path 20a) may induce voltages in the other measuring paths 20b, 20c., especially at turn-off. It is therefore in principle possible for crosstalk to occur.

Figure 12B:
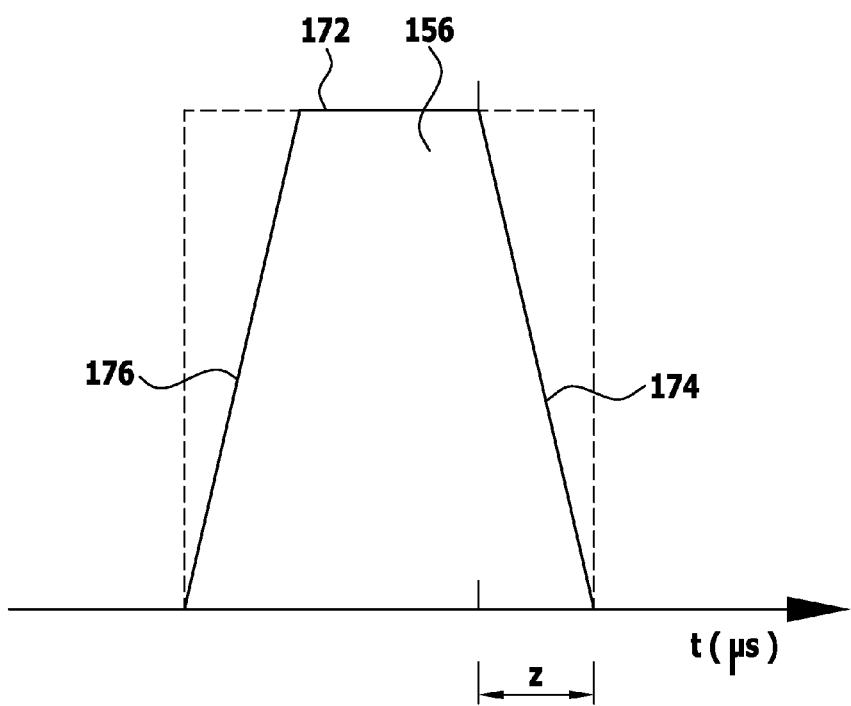
FIG. 12(b) is a schematic representation of a current pulse.

In accordance with the invention, an induction voltage limiting device 170 is provided which adjusts an edge steepness 172 (FIG. 12(b)) of an excitation current pulse 156 in particular at turn-off in such a manner that in particular a decay from maximum amplitude 174 to zero amplitude occurs within a time period of at least 1.5 µs and in particular within a time period of at least 2 µs and in particular within a time period of at least 3 µs.

The magnitude of induced voltages is reduced by adjusting a corresponding edge steepness.

In this regard, it is also possible to adjust a corresponding finite edge steepness 176 at turn-on. The induction voltage limiting device 170 is for example implemented through an RCD element.

In an embodiment, a magnet device 178 is integrated in the coil holder 64 (FIG. 2). By way of example, the magnet device 178 is implemented by magnets which are integrated in the corresponding latches 80a, 80b, 80c. The magnetic device 178 is a bias magnet device which serves to reduce crosstalk among measuring paths 20a, 20b, 20c or measuring path continuations 22a, 22b, 22c. It is thereby possible to reduce the influence a current pulse travelling on one measuring path has on the pickup coil associated with another measuring path.

The latches 80a, etc. can be plastic-bonded magnets for example. The orientation and strength of the magnetic field can be specifically adjusted.

The solution in accordance with the invention provides for current-carrying conductors to be routed exactly parallel. This prevents the occurrence of interference fields that may result from a crossover design.

Within the measuring head 16, crosstalk is reduced by the pickup coils 146 being spaced farther apart from one another as a result of the offset arrangement thereof with respect to the axis 26.

In a variant of an embodiment, the measuring path holder 24 and the coil holder 64 additionally have one or more conductors 180 (FIG. 5) arranged therein. A conductor 180 is routed in a parallel path for example. Meander-like routing or the like is also possible. By use of one or more current-carrying conductors 180 and with a corresponding lay of the conductor 180 and adjustment of the current intensity, possible crosstalk between different measuring paths 20a, 20b, 20c can be compensated for.

The path measuring apparatus 10 constructed in accordance with the invention operates as follows:

The path measuring apparatus 10 is redundant in terms of its measuring paths 20a, 20b, 20c. In the example of an embodiment described herein, the path measuring apparatus 10 is multiply redundant because three separate measuring paths 20a, 20b, 20c are provided. These measuring paths 20a, 20b, 20c are independent of one another. They determine the position of the position indicator 14 independently of one another.

Crosstalk can be reduced or prevented by corresponding measures.

The different measuring paths 20a, 20b, 20c are integrated in the measuring path holder 24. The latter can be implemented with small installation space requirements (diameter of the order of 7 mm or less).

The measuring path holder 24 is made of a fibreglass-reinforced plastics material. It is thus directly electrically isolating and has low thermal expansion. The constraint load on the measuring paths is thereby greatly reduced.

The measuring paths 20a, etc. with their measuring path continuations 22a, etc. are arranged in an electrically isolating flexible tube, which may be made of a silicone material for example. A corresponding flexible tube 124 provides electrically isolating support with high resistance to shock and low sensitivity to vibrations.

The waveguide 118 of each measuring path 20a, etc. and measuring path continuation 22a, etc. is laid in an S-shaped path using two single bends within the coil holder 64 (one at the transition to the first region 70 and another one at the transition from the first region 70 to the second region 74). This affords a compact design with minimal interference with wave propagation.

Arranged on the flex tape 152 are corresponding resistor elements 154 for normalizing the measuring paths 20a, etc. and measuring path continuations 22a, etc.

The shield tubes 142 for each measuring path 20a and measuring path continuation 22a, etc. are preferably at their own potential, it being provided for each measuring path 20a, etc. and measuring path continuation 22a, etc. to have a magnetic shielding of its own.

LIST OF REFERENCE NUMBERS 10 path measuring apparatus
12 transducer
14 position indicator
16 measuring head
18 path device
20a first measuring path
20b second measuring path
20c third measuring path
22a first measuring path continuation
22b second measuring path continuation
22b third measuring path continuation
24 measuring path holder
26 longitudinal direction
28a first recess
28b second recess
28c third recess
30 T-shaped elements
32 angle
34 wall
36 first region
38 flat side
40 transition region
42 second region
44 central region
45 opening
46 measuring path holder carrier
48 cylinder sleeve
50 pot
52 opening
54 interior space
56 collar
58 bottom
60 space
62 marking
64 coil holder
66 groove
68a first recess
68b second recess
68c third recess
70 first region
72 end face
74 second region
76 end face
78 latch device
80a latch
80b latch
80c latch
82 axis
84 edge region
86 projection
88 lug
90 inlet opening
92 holding plate
94 first region
96 flange
98 opening
100 interior space
102 first portion
104 second portion
106 contact face
108 cylindrical outer contour
110 edge collar
112 cutout
114 lug
116 opening
118 wire waveguide
120 solder point
122 end
124 flexible tube
126 return conductor
128 location
130 damping mass
132 damping mass
134 damping sleeve
136 measuring range
138 bottom
140 sleeve
142 shield tube
144 coil device
146 pickup coil
150a pin
150b pin
150c pin
150d pin
152 tape
154 resistor element
156 excitation current pulse
158 magnetic field
160 measuring point
162 magnetic field lines 164 direction
166 direction
168 end
170 induction voltage limiting device
172 edge steepness
174 maximum amplitude
176 edge steepness
178 magnet device
180 conductor

The invention claimed is:

1. Path measuring apparatus, comprising:
    at least a first measuring path and a second measuring path, the first and second measuring paths each extending in a longitudinal direction and being oriented parallel to one another in at least a measuring range;
    at least one position indicator which couples to the first and second measuring paths in a non-contact manner; and
    a measuring path holder which extends in the measuring range and has recesses, each recess having one of the first and second measuring paths arranged therein;
    wherein the measuring path holder has T-shaped elements relative to its cross-section, said T-shaped elements having the recesses formed therebetween.

2. Path measuring apparatus in accordance with claim 1, wherein at least a third measuring path is provided.

3. Path measuring apparatus in accordance with claim 1, wherein the first and the second measuring paths each comprises a waveguide.

4. Path measuring apparatus in accordance with claim 3, wherein the waveguide is arranged in a flexible tube.

5. Path measuring apparatus in accordance with claim 4, wherein the flexible tube is constricted at locations thereof spaced apart from one another.

6. Path measuring apparatus in accordance with claim 1, wherein the measuring path holder is made of a fiber-reinforced material.

7. Path measuring apparatus in accordance with claim 6, wherein a fiber orientation of the fiber-reinforced material is at least approximately parallel to a longitudinal direction of the measuring path holder.

8. Path measuring apparatus in accordance with claim 1, wherein the recesses on the measuring path holder are arranged in a rotationally symmetrically distributed manner about a longitudinal axis of the measuring path holder.

9. Path measuring apparatus in accordance with claim 1, wherein at least one of the recesses on the measuring path holder is laterally open.

10. Path measuring apparatus in accordance with claim 1, wherein at least one of the measuring paths in the respective recess is surrounded by wall material of the recess at an angle of at least 220°.

11. Path measuring apparatus in accordance with claim 1, wherein the measuring path holder extends along an entire length of the measuring paths.

12. Path measuring apparatus in accordance with claim 1, wherein the measuring path holder has a cylindrical outer contour.

13. Path measuring apparatus in accordance with claim 1, wherein a maximum thickness of the measuring path holder is 10 mm at most.

14. Path measuring apparatus in accordance with claim 1, wherein the T-shaped elements are arranged in a star-shaped manner.

15. Path measuring apparatus in accordance with claim 1, wherein at least one of the recesses has a first region in which confining walls have an at least approximately flat side.

16. Path measuring apparatus in accordance with claim 15, wherein the at least one of the recesses has a second region in which walls confining the recess are rounded.

17. Path measuring apparatus in accordance with claim 1, wherein the measuring path holder has a central region in which walls confining the recesses are of uniform wall thickness.

18. Path measuring apparatus in accordance with claim 1, wherein the measuring paths are linearly oriented within the measuring range.

19. Path measuring apparatus in accordance with claim 1, wherein a measuring range length of the measuring paths is at least 2 cm.

20. Path measuring apparatus in accordance with claim 1, wherein the measuring paths are independent of one another and simultaneously couple to the same at least one position indicator.

21. Path measuring apparatus in accordance with claim 1, wherein a measuring head is provided which has the measuring path holder arranged thereon.

22. Path measuring apparatus in accordance with claim 21, wherein the measuring paths each have a continuation into the measuring head.

23. Path measuring apparatus in accordance with claim 22, wherein a latch device is provided, said latch device comprising a latch associated with a respective measuring path continuation, said latch being arranged on a coil holder and fixing the continuation of the measuring path in the coil holder.

24. Path measuring apparatus in accordance with claim 23, wherein a magnet device is integrated in the latch device.

25. Path measuring apparatus in accordance with claim 21, wherein the measuring head has cross-sectional dimensions larger than that of the measuring path holder.

26. Path measuring apparatus in accordance with claim 21, wherein the measuring head has arranged thereon a holding device for fixing the path measuring apparatus to an application.

27. Path measuring apparatus in accordance with claim 21, wherein a coil device is arranged on the measuring head, with each measuring path having at least one pickup coil associated therewith.

28. Path measuring apparatus in accordance with claim 27, wherein an area of a continuation of the measuring path, which is within the measuring head and is coupled to the coil device, is positioned outwardly offset with respect to a longitudinal axis of the measuring path holder.

29. Path measuring apparatus in accordance with claim 28, wherein said area of the continuation is at least approximately linearly oriented.

30. Path measuring apparatus in accordance with claim 28, wherein the continuation of the measuring path has a transition region between the measuring path holder and the coil device.

31. Path measuring apparatus in accordance with claim 27, wherein the pickup coils, which are associated with the respective measuring paths, are arranged in a rotationally symmetrically distributed manner about an axis of the measuring head.

32. Path measuring apparatus in accordance with claim 27, wherein the at least one pickup coil of the respective measuring path has in each case at least one resistor element associated therewith.

33. Path measuring apparatus in accordance with claim 32, wherein the at least one resistor element is arranged on a flexible tape.

34. Path measuring apparatus in accordance with claim 21, wherein the measuring head has a coil holder to which is fixed a measuring path holder carrier.

35. Path measuring apparatus in accordance with claim 34, wherein the measuring path holder carrier has at least one of a marking device and a positioning device for the measuring path holder.

36. Path measuring apparatus in accordance with claim 34, wherein the measuring path holder carrier and the coil holder have associated therewith a lug-and-groove device for rotational fixing one to the other.

37. Path measuring apparatus in accordance with claim 34, wherein a holding device plate is fixed to the coil holder.

38. Path measuring apparatus in accordance with claim 37, wherein the holding device plate and the coil holder have associated therewith a lug-and-groove device for rotational fixing.

39. Path measuring apparatus in accordance with claim 1, wherein the measuring paths are individually electrically isolated.

40. Path measuring apparatus in accordance with claim 1, wherein each measuring path has a magnetic shield associated therewith.

41. Path measuring apparatus in accordance with claim 1, wherein a pickup coil device which is associated with a respective measuring path has in each case a magnetic shield.

42. Path measuring apparatus in accordance with claim 40, wherein each magnetic shield is at its own potential.

43. Path measuring apparatus in accordance with claim 1, wherein an induction voltage limiting device is provided which influences an edge steepness of current pulses at at least one of a turn-on and a turn-off.

44. Path measuring apparatus in accordance with claim 1, wherein the measuring path holder has at least one additional conductor arranged therein.

45. Path measuring apparatus in accordance with claim 1, wherein said path measuring apparatus is configured as a magnetostrictive path measuring apparatus.

46. Path measuring apparatus, comprising:
at least a first measuring path and a second measuring path, the first and second measuring paths each extending in a longitudinal direction and being oriented parallel to one another in at least a measuring range;
at least one position indicator which couples to the first and second measuring paths in a non-contact manner;
a measuring path holder which extends in the measuring range and has recesses, each recess having one of the first and second measuring paths arranged therein;
a measuring head which has the measuring path holder arranged thereon; and
a coil device arranged on the measuring head, with each measuring path having at least one pickup coil associated therewith;
wherein an area of a continuation of the measuring path, which is within the measuring head and is coupled to the coil device, is positioned outwardly offset with respect to a longitudinal axis of the measuring path holder.

47. Path measuring apparatus, comprising:
at least a first measuring path and a second measuring path, the first and second measuring paths each extending in a longitudinal direction and being oriented parallel to one another in at least a measuring range;
at least one position indicator which couples to the first and second measuring paths in a non-contact manner;
a measuring path holder which extends in the measuring range and has recesses, each recess having one of the first and second measuring paths arranged therein; and
a measuring head which has the measuring path holder arranged thereon, the measuring head having a coil holder to which is fixed a measuring path holder carrier;
wherein the measuring path holder carrier and the coil holder have associated therewith a lug-and-groove device for rotational fixing one to the other.

48. Path measuring apparatus, comprising:
at least a first measuring path and a second measuring path, the first and second measuring paths each extending in a longitudinal direction and being oriented parallel to one another in at least a measuring range;
at least one position indicator which couples to the first and second measuring paths in a non-contact manner;
a measuring path holder which extends in the measuring range and has recesses, each recess having one of the first and second measuring paths arranged therein;
a measuring head which has the measuring path holder arranged thereon, the measuring head having a coil holder to which is fixed a measuring path holder carrier; and
a holding device plate fixed to the coil holder.

49. Path measuring apparatus, comprising:
at least a first measuring path and a second measuring path, the first and second measuring paths each extending in a longitudinal direction and being oriented parallel to one another in at least a measuring range;
at least one position indicator which couples to the first and second measuring paths in a non-contact manner;
a measuring path holder which extends in the measuring range and has recesses, each recess having one of the first and second measuring paths arranged therein;
a measuring head which has the measuring path holder arranged thereon, the measuring paths each having a continuation into the measuring head; and
a latch device, the latch device comprising a latch associated with a respective measuring path continuation, said latch being arranged on a coil holder and fixing the continuation of the measuring path in the coil holder.

* * * * *